INVENTOR.
Robert M. Williams,
BY

Patented Dec. 23, 1952

2,622,843

UNITED STATES PATENT OFFICE 2,622,843

TURBINE CONSTRUCTION FOR TURBOJET ENGINES

Robert M. Williams, Toledo, Ohio, assignor to Packard Motor Car Company, Detroit, Mich., a corporation of Michigan Application December 17, 1947, Serial No. 792,195

10 Claims. (Cl. 253—65)

The invention relates generally to turbo-jet engines and more particularly to the structure of the turbine portion of such an engine.

In an engine of this character, the power stream from the area where combustion takes place is conducted to the turbine portion of the engine where a part of the energy is utilized to drive the turbine. The latter, in turn, drives the compressor for supplying air for combustion. Such power stream may be delivered to the turbine through an annular passage provided by inner and outer casing structures including a portion forming a nozzle for directing the stream to the turbine blades at the desired angle, the nozzle being provided with fixed blades. Such blades, of course, are subjected to a heavy thrust and torque from the power stream and, therefore, require substantial support. The outer casing structure forming the outer wall of the passage for the power stream may be continued to extend about the turbine, and it is, of course, desirable to hold the outer casing structure as close as possible to the outer ends of the turbine blades to prevent by-passing of the power stream around the blades. The problem of supporting the outer casing to attain this end is made difficult by the fact that the outer casing structure, as well as other parts, has a relatively large amount of expansion due to the temperature difference between its cold condition and its condition when fully heated by the hot combustion gases passing therethrough.

The general object of the invention, therefore, to provide a novel casing structure for the turbine portion of a turbo-jet engine, which provides adequate support for the nozzle blades against the thrust of the power stream, and which supports the part of the casing about the turbine blades in closely concentric relation thereto with a minimum clearance at the ends of the blades.

Another object is to provide a novel casing structure of the foregoing character, which provides support for the nozzle blades both at their inner and their outer ends.

A further object is to provide a novel casing structure of the foregoing character, in which the part of the casing forming the nozzle and extending about the turbine is supported directly from the main frame structure supporting the turbine itself whereby the concentric relation between the outer casing and the turbine is thereby inherently attained.

Still another object is to provide a novel casing structure having the foregoing characteristics and which is relatively simple in its construction so that it may be readily manufactured and easily assembled.

Other objects and advantages will become apparent from the following description taken in connection with the accompanying drawings, in which.

Figure 1:
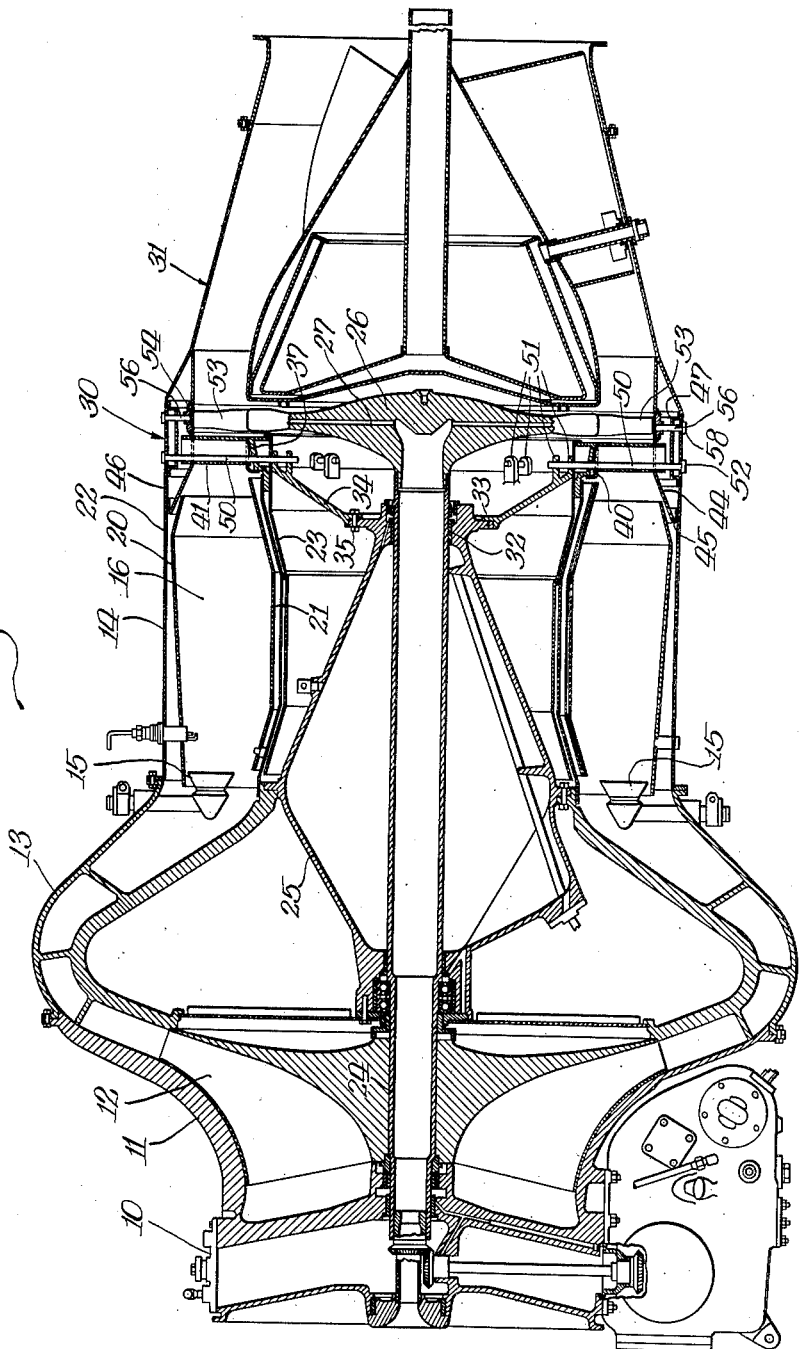
Figure 1 is a longitudinal sectional view of a turbo-jet engine having a casing structure for the turbine portion of the engine, embodying the features of the invention.
Figure 2:
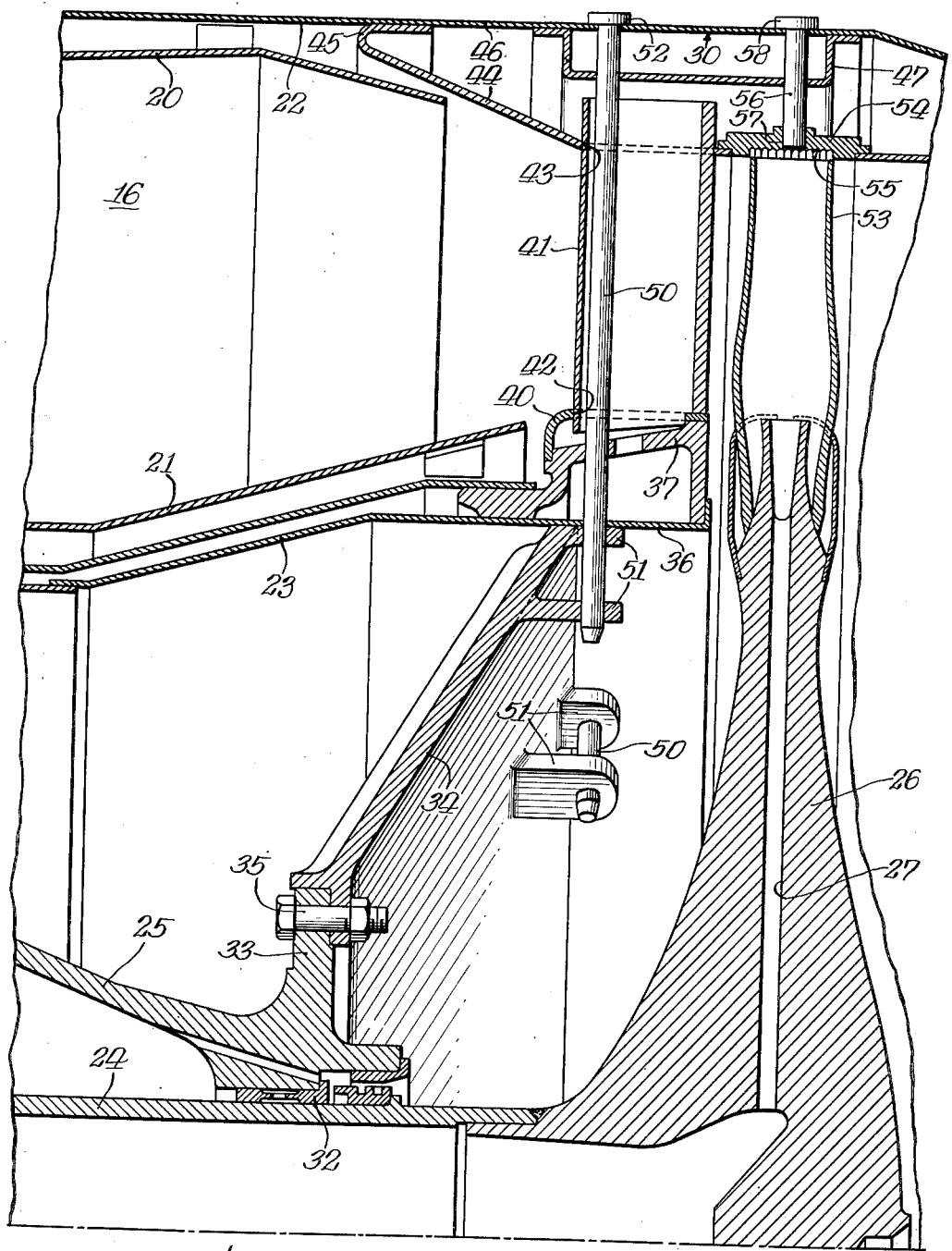
Fig. 2 is an enlarged fragmentary sectional view of a portion of the structure shown in Fig. 1.

To illustrate the invention, I have shown in Fig. 1 of the drawings a turbo-jet engine of a type in which the present invention may be embodied. It is to be understood, however, that the invention is not limited to the particular structure of the engine other than the turbine structure illustrated more in detail in Fig. 2 and covered by the claims, the entire unit being shown merely for purposes of illustration. The unit shown in Fig. 1 comprises an intake section 10 at the forward end of the unit, a compressor section 11 in which is rotatably mounted a compressor 12, a diffuser section 13, and a combustion section 14. In an engine of this character, air is drawn in through the intake section 10 and is compressed by the compressor 12, which forces the air rearwardly through the diffuser section 13 and into the combustion section 14, where fuel introduced by burners 15 is burned in a combustion chamber indicated at 16 and located within the combustion section 14. In the present instance, the combustion chamber 16 is of annular form provided by an outer wall 20 and an inner wall 21, the outer wall 20 being located within an outer casing structure 22. The inner wall 21 of the combustion chamber is preferably mounted in spaced relation to an inner casing structure 23. The compressor 12 is carried on the forward end of a shaft 24 rotatably mounted in a main frame 25 located within the inner casing structure 23. The shaft 24 extends rearwardly through the frame 25 and carries at its rear end a turbine rotor 26. In the present instance, the shaft 24 is shown as being tubular in form to permit air to enter the front end thereof and be carried rearwardly therethrough to the interior of the turbine rotor 26, through which the air is discharged by means of radial passages 27 to prevent the rotor 26 from becoming overheated. The outer casing structure 22 may be carried rearwardly to provide a turbine section, indicated generally at 30, and then merging into a tail spout, indicated generally at 31.

The power stream which ultimately produces the jet emerges from the downstream end of the combustion chamber 16 and is conducted through the turbine section 30 where a portion of the energy of the power stream is utilized to drive the turbine, the turbine, of course, functioning to drive the compressor 12 by its connection therewith through the shaft 24. In the turbine section 30, the power stream is passed through a nozzle, annular in form to conform to the combustion chamber, where nozzle blades are located to direct the power stream at the desired angle against turbine blades carried on the rotor 26. The power stream thereby exerts considerable thrust on the stationary nozzle blades so that such blades require substantial support. Because of the high temperatures existing in the combustion gases and the fact that the nozzle blades are subjected to such temperatures, provision must be made for permitting the various parts in the turbine section to expand under the influence of such temperatures. At the same time, it is, of course, desirable to hold them in concentric relation and to provide adequate support against the thrust of the power stream. The present structure is, therefore, arranged to freely permit the expansion of the parts under the temperatures incurred and yet to hold the parts in concentric relation with adequate support for the nozzle blades. A problem also arises in supporting the outer casing structure in such a manner that it extends about the turbine blades with a minimum of clearance at the outer ends thereof, so that the combustion gases cannot by-pass around the ends of the turbine blades, provision similarly being made in this part of the structure for the expansion. The expansion, of course, in any of the annular parts is circumferential and, while the structure must provide for such expansion, it must also maintain the concentric relation of the parts.

To provide for the desired amount of support for the nozzle blades, I provide a structure which supports the blades at both their inner and outer ends with the ultimate support based on the main frame structure 25. With this arrangement, the nozzle blades are adequately held in the desired position and the casing structure extending about the outer ends of the turbine blades is held in truly concentric relation thereto because of the ultimate support of such casing structure from the main frame, which also supports the turbine rotor itself. The concentricity of the casing structure and the turbine rotor with its blades is thus inherent in such arrangement.

As shown in the drawings, the turbine rotor 26 is mounted on one end of the tubular shaft 24. Such shaft 24 is journaled in a bearing 32 at the adjacent end of the main frame 25. The turbine rotor thus is supported by said end of the main frame 25 so that, by supporting the casing structures from the same end of the main frame, the concentric relationship of the parts will be inherently attained. To this end, the main frame adjacent the bearing 32 is provided with an outwardly directed flange 33 to which is secured a diaphragm 34, the diaphragm in the present instance being shown as secured to the flange by means of bolts 35. The diaphragm 34 is of a rigid construction and is utilized as the main support for the casing structures. In the present arrangement, the inner casing structure 23 includes an annular sheet-metal member 36 enclosing the periphery of the diaphragm 34 and having mounted exteriorly thereof a nozzle supporting ring 37. The nozzle supporting ring 37 is of an extremely rigid construction. Overlying the exterior of a portion of the nozzle supporting ring 37 is an inner sheet-metal nozzle member 40 in which a plurality of generally radially arranged nozzle blades 41 are mounted. The nozzle blades 41 have their inner ends mounted in apertures 42 in the inner nozzle member 40 and extend crosswise of the nozzle passage. The nozzle blades 41 are of hollow construction so that cooling air may be passed therethrough to prevent them from becoming excessively heated from the combustion gases. The nozzle blades 41 at their outer ends extend through closely fitting apertures 43 formed in an outer annular nozzle member 44 constituting a portion of the outer casing structure. The outer nozzle member 44 constitutes, in effect, a continuation of the outer wall 20 of the combustion chamber and for this purpose slants forwardly and outwardly and is reversely bent at its outer end as at 45 to engage an outer shell 46, which also constitutes a portion of the outer casing structure. To reinforce the shell 46 in the turbine portion 30, an annular sheet-metal member 47, preferably having a channel-shaped cross section, is rigidly mounted within the outer shell 46.

To support the inner and outer casing structures from the diaphragm 34, supports are provided which are connected at their inner ends to the diaphragm 34 and extend through aligned apertures in the various parts of the inner and outer casing structures to hold the parts in concentric relation and at the same time permit relative circumferential expansion of the parts. As shown in the drawing, the supports comprise elongated pins 50. It is unnecessary to provide as many pins 50 as there are blades and, in fact, only a relatively few of the blades 41 enclose pins 50. For example, I may provide a structure in which there are forty-eight of the nozzle blades 41 arranged in equally spaced relation about the nozzle passage and I may utilize only eight of the pins 50. Such eight pins, however, are, of course, arranged in equally spaced relation about the circumference of the structure.

The pins 50 are held in true radial position by the diaphragm 34. To this end, the diaphragm 34 is provided with a plurality of circumferentially spaced pairs of ears 51, the ears of each pair being radially spaced, as is clearly evident in Fig. 2. The ears of each pair are provided with aligned apertures which receive the inner end of the pin 50 and thus hold the pin in the desired radial position. Each pin 50 extends through a similar aperture in the annular member 36, the nozzle supporting ring 37, the reinforcing member or ring 37 and the outer shell 46, each pin 50 extending through a nozzle blade 41. Since each pin 50 merely extends in the aligned apertures in the various parts, such parts are free to expand circumferentially but are held in truly concentric relation with one another since the pins 50 are circumferentially spaced. To prevent the pins 50 from falling out of position, each pin is provided with a head 52 at its outer end which may be secured to the outer shell 46 as by welding or other means.

With the foregoing structure, the pins will permit circumferential expansion of the parts due to temperature differences to which they are subjected. However, such pins hold the parts in truly concentric relation and prevent any shifting thereof other than the above-mentioned expansion. The outer shell 46 and the outer nozzle member 44 are thus accurately held in the desired position. Since each blade 41 is supported at its inner end by the inner nozzle member 40 and at its outer end by the outer nozzle member 44, the blade is thereby supported at both of its ends against the thrust exerted by the power stream.

As heretofore mentioned, another feature of the invention lies in the manner of supporting the casing structure about the turbine. The turbine rotor 26 carries on its periphery a plurality of blades 53. As an example, sixty-six such blades are employed in one embodiment. It is, of course, desirable to prevent the power stream from by-passing around the outer ends of the blades 53 since a certain amount of energy is to be taken from the power stream to drive the turbine. To prevent such by-passing, the outer casing structure includes a part extending about the outer ends of the blades in as close relation thereto as possible without actual engagement with the ends of the blades. In the present instance, the outer casing structure includes a shroud member 54 in the form of a ring. The problem of holding the shroud member 54 close to the ends of the blades 53, of course, is complicated by the fact that provision must be made for the circumferential expansion occurring because of the temperature of the power stream. As a partial check against by-passing around the outer ends of the blades 53, the inner surface of the shroud member 54 may be grooved as at 55 to provide a plurality of ridges in the inner surface thereof, forming a labyrinth which tends to reduce the passage of gases therebetween.

The feature of the present invention involved in the mounting of the shroud member 54 is to support it from the same portion of the main frame 25 by which the turbine rotor is supported. Thus, as described above, the outer nozzle member 44, the outer shell 46, and the reinforcing ring 47 are all held in truly concentric position with the main frame by means of the pins 50. The outer nozzle member 44 is extended downstream from the nozzle portion of the turbine far enough to engage and be secured to the shroud member 54. The latter is thus partially supported by a member held in concentric relation with the main frame. Further support of the shroud member 54 is effected by means of a plurality of pins 56. Each pin 56 extends radially inward through the outer shell 46 and the reinforcing ring 47 in aligned apertures therein so that it is held in a radial position. Each pin 56 also extends inwardly beyond the reinforcing ring 47 and into the shroud member 54 as indicated at 57. A sufficient number of such pins 56 in circumferentially spaced relation to each other are provided, so that the shroud member 54 is thus supported not only by the inner nozzle member 44 but is also held in a truly concentric relation to the other parts by the pins 56. It will be obvious that, while the pins 56 permit circumferential expansion of the shroud member 54 relative to the shell 46 and reinforcing ring 47, the shroud will be held against all other movement relative thereto. Since, as described in the foregoing structure, the shell 46 and reinforcing ring 47 are supported through the pins 50 and the diaphragm 34 so that they are in truly concentric relation with the main frame 25, and since the turbine rotor 26 is likewise supported by the main frame 25, the shroud member 54 will be held in a concentric relation with the turbine rotor 26 with a minimum of clearance therebetween. Each pin 56 may be provided with a head 58 at its outer end, which may be secured to the shell 46 similarly to the pins 50 to hold it in place.

It will be evident from the foregoing description of the parts that such parts are held in the desired relationship to each other with provision made for the circumferential expansion arising because of the temperature differences occurring in the engine. The parts are all of simple construction which may be readily manufactured, as is evident from a mere inspection of the drawings, and which permit easy assembly of the parts.

I claim:

1. In a turbo-jet engine, separate inner and outer casing structures providing an annular nozzle for conducting the power stream to the turbine, generally radially positioned hollow blades in said nozzle and connected at their ends to the respective casing structures, a frame within the inner casing structure, and radially positioned supports extending through said blades and, independently of the connection of the blades with the respective casing structures, supporting the outer casing structure at their outer ends and connecting the inner casing structure to said frame at their inner ends.

2. In a turbo-jet engine, separate inner and outer casing structures providing an annular nozzle for conducting the power stream to the turbine, generally radially positioned hollow blades in said nozzle and connected at their ends to the respective casing structures, a frame within the inner casing structure, and radially positioned supports extending through said blades and connecting said outer and inner casing structures and said frame independently of the connection of the blades with the respective casing structures, whereby said blades are supported at both ends against the thrust of the power stream.

3. In a turbo-jet engine, separate inner and outer casing structures providing an annular nozzle for conducting the power stream to the turbine, generally radially positioned hollow blades in said nozzle and connected at their ends to the respective casing structures, a frame within and separate from the inner casing structure, and radially positioned supports extending through said blades and through radially aligned apertures in said frame and said inner and outer casing structures, said supports being held in radial position by said frame and thereby holding said casing structures against all movement except circumferential expansion, whereby said blades are supported at both ends against the thrust of the power stream.

4. In a turbo-jet engine, a frame including a diaphragm, an inner casing structure comprising a supporting ring extending about said diaphragm, and an inner nozzle member mounted on said ring, and outer casing structure separate from said inner casing structure and comprising a shell and an outer nozzle member, said nozzle members being radially spaced to provide an annular nozzle for conducting the power stream to the turbine, a plurality of hollow nozzle blades located in said nozzle and secured at their ends to said nozzle members, and a plurality of pins extending through radially aligned apertures in said diaphragm, said ring and said shell and being enclosed by the respective blades, said pins being held in radial position by said diaphragm and thereby holding said casing structures against all movement except circumferential expansion, whereby said blades are rigidly supported at both ends by said nozzle members against the thrust of the power stream.

5. In a turbo-jet engine, a frame including a diaphragm having a plurality of circumferentially spaced pairs of radially spaced ears, an inner casing structure extending about said diaphragm, an outer casing structure, said casing structures being radially spaced and separate from each other to provide an annular nozzle for conducting the power stream to the turbine, a plurality of hollow blades positioned generally radially in said nozzle and secured at their ends to the respective casing structures, and a plurality of pins, one for each pair of ears and extending through radially aligned apertures therein whereby each pin is held in a radial position, said pins extending through said inner casing structure and certain of said blades and into said outer casing structure for holding said casing structures against all movement except circumferential expansion whereby said blades are rigidly supported at both their inner and outer ends against the thrust of the power stream.

6. In a turbo-jet engine, a frame, a turbine rotor rotatably supported by said frame and having a plurality of blades extending generally radially at its periphery, inner and outer casing structures separate from each other and extending about said frame, said structures being in spaced relation to each other to provide an annular nozzle for conducting the power stream to the turbine blades, a plurality of hollow nozzle blades mounted in said nozzle and secured at their ends to said inner and outer casing structures, a shroud carried by said outer casing structure and extending about the outer ends of said turbine blades, and a plurality of supports mounted in said frame and extending through said nozzle blades to support the outer casing structure from said frame, whereby said shroud is held in concentric relation with the turbine rotor with a minimum of clearance between the outer ends of the turbine blades and said shroud.

7. In a turbo-jet engine, a frame, a turbine rotor positioned adjacent one end of said frame and carried by a shaft journalled in said frame, said rotor carrying at its periphery a plurality of blades, nozzle-forming means for conducting the power stream to said blades and including an outer casing structure supported from said one end of the frame, generally radially positioned hollow blades in said nozzle and connected at their ends between the frame and the casing, radially positioned supports extending through said blades, said radial supports being adapted to support said outer casing from said frame independently of said blades, and an annular shroud carried by said outer casing structure and extending about said turbine blades, said shroud and said turbine rotor being held in concentric relation with a minimum of clearance between the shroud and the blades by being supported from the same portion of said frame on said radially positioned supports.

8. In a turbo-jet engine, a frame including a diaphragm located at one end thereof, a turbine rotor having on its periphery a plurality of blades extending generally radially, said rotor being carried by said frame adjacent said diaphragm, inner and outer casing structures positioned in spaced relation to each other to provide a nozzle for conducting the power stream to the turbine blades, generally radially disposed hollow blades in said nozzle said outer casing structure extending about said rotor and including a shroud located in close proximity to the ends of said blades, and radially disposed supporting members extending through said blades for independently connecting said outer casing structure to said diaphragm, whereby said shroud is held in concentric relation with the blades with a minimum of clearance therebetween.

9. In a turbo-jet engine, a frame including a diaphragm located at one end thereof, a turbine rotor having on its periphery a plurality of blades extending generally radially, said rotor being carried by said frame adjacent said diaphragm, inner and outer casing structures positioned in space relation to each other to provide a nozzle for conducting the power stream to the turbine blades, said outer casing structure extending about said rotor, an annular shroud carried by said outer casing structure about the outer ends of said blades, a plurality of pins held in radial position by said diaphragm and extending through aligned apertures in said casing structures to hold the latter against all relative movement except circumferential expansion, and a plurality of pins held in radial position by said outer casing structure and extending into said shroud, whereby said shroud is held in concentric relation with said blades with a minimum of clearance therebetween.

10. In a turbo-jet engine, a frame including a diaphragm at one end thereof, a turbine rotor having a plurality of blades extending generally radially from its pheriphery, said rotor being carried by said frame adjacent said diaphragm, inner and outer casing structures in radially spaced relation to each other to provide an annular nozzle for conducting the power stream to said blades, said outer casing structure extending about said rotor and including an outer shell and a reinforcing ring of channel-shape cross section secured thereto, an annular shroud carried by said outer casing structure about the ends of the blades, a plurality of pins held in radial position by said diaphragm and extending through said reinforcing ring and shell to hold them against all relative movement except circumferential expansion, and a plurality of pins held in radial position by said shell and said reinforcing ring and extending into said shroud, whereby said shroud is held in concentric relation with said blades with a minimum of clearance therebetween.

ROBERT M. WILLIAMS.

REFERENCES CITED

The following references are of record in the file of this patent:

UNITED STATES PATENTS

| Number | Name | Date |
|---|---|---|
| 2,412,365 | Sollinger | Dec. 10, 1946 |
| 2,415,104 | Ledwith | Feb. 4, 1947 |
| 2,429,936 | Kenney et al. | Oct. 28, 1947 |
| 2,445,661 | Constant et al. | July 20, 1948 |
| 2,459,935 | Halford | Jan. 25, 1949 |

FOREIGN PATENTS

| Number | Country | Date |
|---|---|---|
| 111,008 | Switzerland | Nov. 16, 1925 |